Dec. 31, 1940. J. D. TENNISON 2,227,205
PROCESS OF MAKING LAMINATED SHINGLES
Filed Aug. 13, 1937
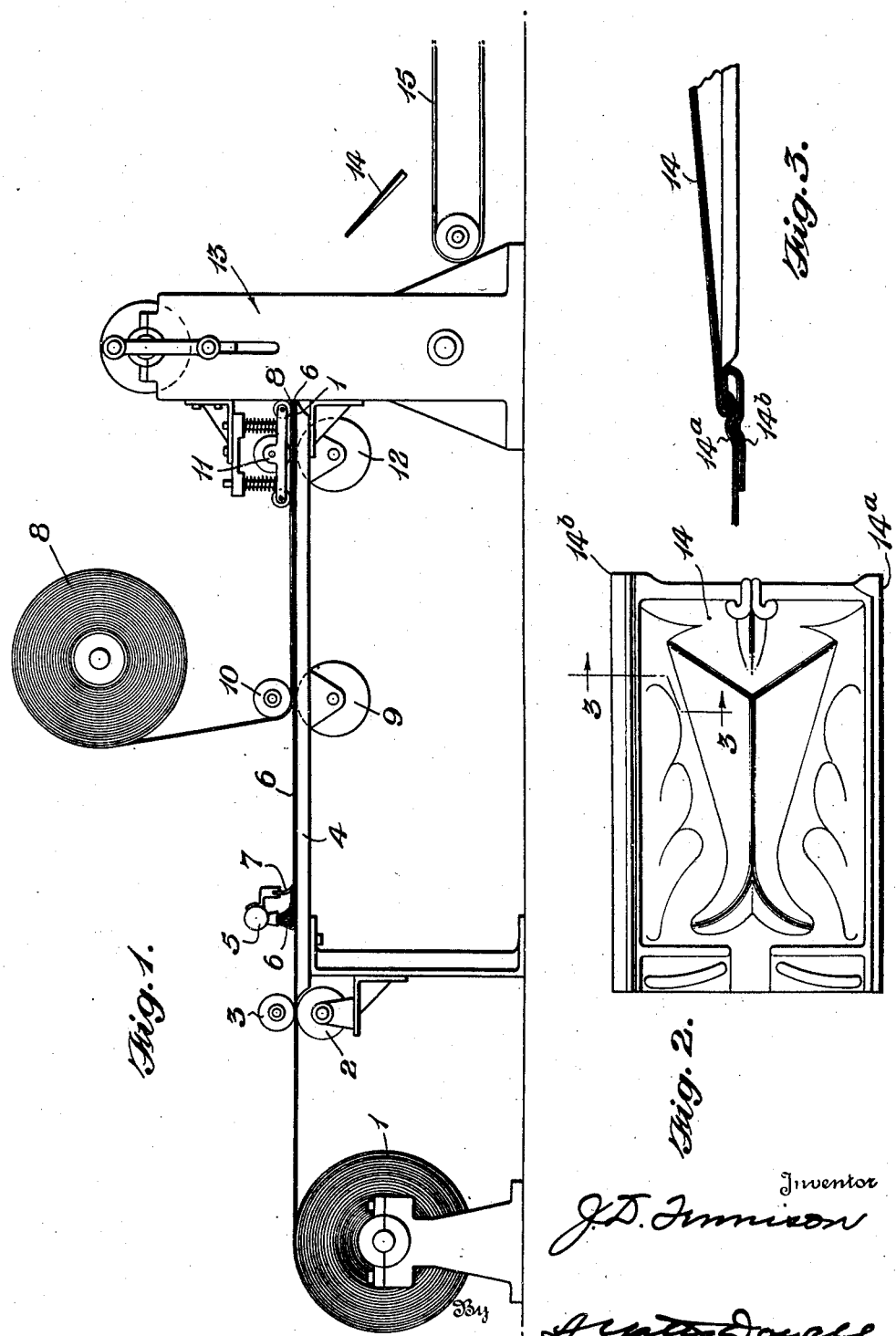
Inventor
J. D. Tennison
By A. Yates Dowell
Attorney Patented Dec. 31, 1940

2,227,205

UNITED STATES PATENT OFFICE 2,227,205

PROCESS OF MAKING LAMINATED SHINGLES

James Daniel Tennison, Memphis, Tenn., assignor to Tennison Brothers, Incorporated, Memphis, Tenn., a corporation Application August 13, 1937, Serial No. 158,986

1 Claim. (Cl. 154—2)

This invention relates to the fabrication of a shingle and more particularly to the fabrication of a laminated, weather-proof, insulated shingle.

An object of the invention is to fabricate simply and economically a strong shingle having desirable weather resisting and insulating properties.

Another object of the invention is the fabrication of individual shingles from a large laminated sheet.

The foregoing and other objects will become apparent in view of the following description taken in conjunction with the drawing, wherein:

Figure 1 is a side elevation of an apparatus for continuously fabricating shingle units in accordance with my invention.

Figure 2 is a plan view of a finished, embossed, laminated, shingle fabricated in accordance with my invention.

Figure 3 is an end view of two shingles, with parts broken away, showing their respective edges in mating relation.

Referring to drawing a large roll of sheet metal 1 is unrolled and fed at a predetermined desirable speed by power roller 2 and friction roller 3 onto table 4 beneath a spray 5 or other applicator of a suitable cement 6 which is applied evenly by spreader 7 to the entire sheet. Above and to one side of the roll of sheet metal 1 is a roll of insulating material 8 which may be paper, sheet cork, fabric, asbestos, or other heat and/or sound insulating material. This roll of sheet material is fed in a manner similar to the feeding of the sheet metal 1, as for example by power roller 9 and friction roller 10 and thereabove. A spring pressed roller unit 11 or other suitable pressing device, cooperating with power roller 12 may be utilized to apply pressure and a squeegee action to the sheet metal coated with cement and the sheet insulating material in a manner to securely bond the two together making for a laminated product comprising: first, a relatively large sheet of metal 1, second, a layer of cement 6; and third, heat insulating material 8 similar in size though not necessarily of the same thickness and shape to the sheet metal.

This laminated material is then fed also by operation of rollers 11 and 12 at a predetermined desirable speed to a press and cutting machine, shown generally at 13 which may be hydraulically or otherwise operated in a manner to form a complete finished shingle 14 at each stroke of said press. Simultaneously the shingle is given strength by decorative embossing, clearly depicted in Figure 2, and its edges 14a and 14b are formed in a manner to provide the proper mating of two or more shingles as shown in Figure 3 so that the shingles may be assembled into strong wall structure, simply and inexpensively. The finished shingle may then be carried away to a packing room, not shown, by conveyor 15, where the units may be bundled together in a suitable manner pending their actual intended use.

Therefore it has been the practice in the fabrication of a laminated shingle to cut the metal sheet to the size of the shingle, then to cut the insulating material or other lamination to a size corresponding to the finished shingle and then to cement the two together to form the finished shingle. This old process makes for much waste of material, loss of time, unevenness of product and is generally unsatisfactory. The process first described is inherently far superior in that the finished product is uniform, even, and is much less expensive to manufacture. The rolls of sheet metal and of sheet insulating material are easy to procure and lend themselves readily to my novel process.

By a single stamping operation the insulating material is completely bonded to the metal lamination by the action of the press, the embossing is impressed on the shingle in a manner to affect all the laminations of the finished product which adds substantially to the strength of the product, said embossing being of such pattern as to provide edges on each shingle of such nature that they will properly mate with one another when assembled into a wall structure. The metal lamination of said finished shingle may then be painted with any suitable paint or may be treated with one or more of various chemicals to provide a particular type of desirable surface such as an oxidized finish or other weather resisting surface.

It will be obvious to those skilled in the art that various changes may be made in this device without departing from the spirit of the invention and therefore the invention is not limited to what is shown in the drawing and described in the specification but only as indicated in the appended claim.

I claim:

The process of fabricating an embossed laminated metal-paper shingle having a weather resisting top surface of metal, resilient, heat resisting and sound absorbing bottom surface of paper, and interlocking edges including reverse bends adapted to make a metal-paper-metal seal comprising: unrolling a roll of sheet metal, applying wet adhesive evenly over one surface of said unrolled sheet metal, unrolling a roll of paper, applying said unrolled paper to the unrolled sheet metal surface having thereon the adhesive medium, pressing the sheets together to form a large laminated sheet, cutting said large laminated sheet in a manner to provide unitary shingles, embossing said laminated sheet whereby it will be imbued with the quality of resistance to bending, and forming at least one of the edges of said shingles with a reverse bend and locking groove with the paper and metal coextensive therewith and with the metal on the exterior surface, forming a second edge of said shingles with a corresponding locking groove and with the paper and metal coextensive therewith and with the paper on the under side whereby two similar shingles may be locked together by associating dissimilar edges, the inner paper surface of the grooved second edge of one shingle being formed to engage the exterior metal surface of the grooved first edge of an adjacent shingle when in assembled relation to form a metal-paper-metal seal which is relatively efficient with regard to sealing efficiency and acts to prevent thermal transfer as occurs in metal to metal seals, said last three steps, namely, those of embossing, cutting, and forming, being effected in related sequence and substantially simultaneously.

JAMES DANIEL TENNISON.